United States Patent
Feng et al.

(10) Patent No.: US 10,848,976 B2
(45) Date of Patent: Nov. 24, 2020

(54) METHOD, SOURCE DEVICE AND POWER NODE FOR DISTRIBUTED DYNAMIC SPECTRUM ALLOCATION

(71) Applicant: Nokia Technologies Oy, Espoo (FI)

(72) Inventors: Jingyu Feng, Shaanxi (CN); Guangyue Lu, Shaanxi (CN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/312,011

(22) PCT Filed: Jun. 24, 2016

(86) PCT No.: PCT/CN2016/087060
§ 371 (c)(1),
(2) Date: Dec. 20, 2018

(87) PCT Pub. No.: WO2017/219354
PCT Pub. Date: Dec. 28, 2017

(65) Prior Publication Data
US 2019/0380040 A1 Dec. 12, 2019

(51) Int. Cl.
*H04L 12/28* (2006.01)
*H04W 16/10* (2009.01)
*H04W 84/20* (2009.01)

(52) U.S. Cl.
CPC ........... *H04W 16/10* (2013.01); *H04W 84/20* (2013.01)

(58) Field of Classification Search
CPC ....................................................... H04L 12/28
USPC ........................................................ 370/329
See application file for complete search history.

(56) References Cited

U.S. PATENT DOCUMENTS

2019/0173779 A1* 6/2019 Gruner ................ G06F 9/45558

FOREIGN PATENT DOCUMENTS

| CN | 101248619 A | 8/2008 |
| CN | 1030002451 A | 3/2013 |
| CN | 103238361 A | 8/2013 |
| CN | 104160731 A | 11/2014 |
| CN | 104796901 A | 7/2015 |
| JP | 5765716 | 8/2015 |

(Continued)

OTHER PUBLICATIONS

Luo, Changqing, et al., "Joint Relay Scheduling, Channel Access, and Power Allocation for Green Cognitive Radio Communications", IEEE Journal on Selected Areas in Communications, vol. 33, No. 5, May 2015, pp. 922-932.

(Continued)

*Primary Examiner* — Dang T Ton
(74) *Attorney, Agent, or Firm* — Harrington & Smith

(57) ABSTRACT

The present invention involves a method for distributed dynamic spectrum allocation performed by a source device and the source device, a method for dynamic spectrum allocation performed by a power node and the power node, the method including sending to appropriate power nodes a query message indicating that the source device requests to find an idle licensed spectrum; receiving from the appropriate power nodes a query response message indicating licensed spectrums; and determining whether the licensed spectrums are idle and selecting an idle licensed spectrum from the licensed spectrums to be used. In this way, the provided method may implement distributed dynamic spectrum allocation without using a central authority.

23 Claims, 2 Drawing Sheets

(56) References Cited

FOREIGN PATENT DOCUMENTS

| KR | 20080066260 A | 7/2008 |
|----|---------------|--------|
| KR | 20150041683 A | 4/2015 |
| KR | 20150096283 A | 8/2015 |
| WO | WO-2011/100103 A2 | 8/2011 |
| WO | WO 2013/045741 A1 | 4/2013 |

OTHER PUBLICATIONS

Jinyuan Gu et al. "A Cross-Layer Design Based on Link Quality for Cognitive Wireless Mesh Networks" 2012 $8^{th}$ International Conference on Wireless Communications, Networking and Mobile Computing (Wicom 2012): Shanghai, China, Sep. 21-23, 2012, IEEE, Piscataway, NJ, Sep. 21, 2012 (Sep. 21, 2012), pp. 1-4, XP032342494.

Jun Zhao et al. "Distributed Coordination in Dynamic Spectrum Allocation Networks", 2005 $1^{st}$ IEEE International Symposium on New Frontiers in Dynamic Spectrum Access Networks, IEEE, Baltimore, MD, USA, Nov. 8, 2005 (Nov. 8, 2005), pp. 259-268, XP010855123.

Behtash Babadi et al.: "Distributed Dynamic Spectrum Allocation for Secondary Users in a Vertical Spectrum Sharing Scenario" IEICE Transactions on Communications, Communications Society, Tokyo, JP, vol. E95B, No. 4, Apr. 1, 2012 (Apr. 1, 2012), pp. 1044-1055, XP001575050.

Ian F. Akyilidiz et al.: "CRAHNs: Cognitive Radio Ad Hoc Networks" Ad Hoc Networks, vol. 7., No. 5, Jul. 1, 2009 (Jul. 1, 2009), pp. 810-836, XP055148293.

Yutaka Ihara et al.: "Distributed Autonomous Multi-Hop Vehicle-to-Vehicle Communications Over TV White Space", Consumer Communications and Networking Congerence (CCNC), 2013 IEEE, IEEE, Jan. 11, 2013 (Jan. 11, 2013), pp. 336-344, XP032349946.

\* cited by examiner

METHOD, SOURCE DEVICE AND POWER NODE FOR DISTRIBUTED DYNAMIC SPECTRUM ALLOCATION

CROSS REFERENCE TO RELATED APPLICATION

This patent application is a U.S. National Stage application of International Patent Application Number PCT/CN2016/087060 filed Jun. 24, 2016, which is hereby incorporated by reference in its entirety.

FIELD OF THE INVENTION

The present invention generally relates to distributed communication networks, more specifically, relates to a method for distributed dynamic spectrum allocation performed by a source device and the source device, a method for dynamic spectrum allocation performed by a power node and the power node.

BACKGROUND

As there is rapid growth of wireless communication technology and huge demand of the capacity for wireless applications, the frequency spectrum has become a scarce resource. In this case, it will become more and more inapplicable to use a fixed spectrum strategy in which each mobile device is allocated a licensed spectrum. We can allocate several licensed spectrums to a wireless communication network in which each device can get a dynamic spectrum according to an allocation strategy. In central wireless communication networks, such dynamic spectrum allocation strategy managed by a central authority can be achieved. However, without a central authority, it is difficult to achieve a dynamic spectrum allocation strategy in distributed wireless communication networks.

When dynamic spectrum allocation is employed in distributed wireless communication networks, it confronts some technical problems, such as:
No central authority can be employed to manage dynamic spectrum allocation.
Conflicts may occur when several devices request the same licensed spectrum.
As we know, the transmit power of some mobile devices is limited, and they send data to the destination devices via many routers. If each router finds corresponding idle licensed spectrum, it may cause a lot of loads to the network.
In cognitive radio networks, the licensed spectrums are allocated to primary users. The other devices should find the licensed spectrums unused by primary users (PUs) to use. However, if the primary user comes back during the time of the routers forwarding data packets, what can routers do?
How to process the licensed spectrum when the destination device has received data packets from the source device?

Currently, cognitive radio networks (CRNs) have been proposed as the typical network to employ dynamic spectrum allocation. In CRNs, a sensing channel is the selected licensed spectrum where a physical point-to-point link between the PU transmitter and each device is used for observing the licensed spectrum, and a reporting channel is a control channel where a physical point-to-point link among mobile devices is used for sending individual sensing information.

In CRNs, mobile devices can opportunistically use the licensed spectrum of the primary users and cause no interference to PUs.

Spectrum sensing is the key technology to find unused licensed spectrums, wherein spectrum sensing can be basically classified as individual spectrum sensing and cooperative spectrum sensing. Due to deep shadowing and multipath fading, sometimes it is very difficult for a device to distinguish a white space from a deep shadowing effect by individual spectrum sensing. Therefore, the main idea of CSS (cooperative spectrum sensing) is to enhance the sensing performance by exploiting spatial diversity via the observations of spatially located SUs (secondary users). By cooperation, SUs can share their sensing information with the system to make a combined decision with increased accuracy as comparing with the individual decisions.

In central CRNs, a fusion center is in charge of managing CSS for dynamic spectrum allocation. With the fusion center, the technical problems can be addressed.

SUMMARY

In this invention, our main efforts are paid to designing a dynamic spectrum allocation solution for distributed wireless communication networks without using a central authority, the present invention provides a method for distributed dynamic spectrum allocation performed by a source device and the source device, a method for distributed dynamic spectrum allocation performed by power node and the power node.

According to a first aspect of the present invention, there is provided a method for distributed dynamic spectrum allocation performed by a source device, comprising:
sending to appropriate power nodes a query message indicating that the source device requests to find an idle licensed spectrum;
receiving from the appropriate power nodes a query response message indicating licensed spectrums; and
determining whether the licensed spectrums are idle and selecting an idle licensed spectrum from the licensed spectrums to be used.

According to a second aspect of the present invention, there is provided a source device for distributed dynamic spectrum allocation, comprising:
sending means, configured to send to appropriate power nodes a query message indicating that the source device requests to find an idle licensed spectrum;
receiving means, configured to receive from the appropriate power nodes a query response message indicating licensed spectrums; and
processing means, configured to determine whether the licensed spectrums are idle and selecting an idle licensed spectrum from the licensed spectrums to be used.

According to a third aspect of the present invention, there is provided a method for the distributed dynamic spectrum allocation performed by power node, comprising:
receiving from a source device a query message indicating that a source device requests to find an idle licensed spectrum;
sending to the source device a query response message indicating licensed spectrums so as to make the source device select an idle licensed spectrum from the licensed spectrums to be used.

According to a fourth aspect of the present invention, there is provided a power node for distributed dynamic spectrum allocation, comprising:

receiving means, configured to receive from a source device a query message indicating that a source device requests to find an idle licensed spectrum;

sending means, configured to send to the source device a query response message indicating licensed spectrums so as to make the source device select an idle licensed spectrum from the licensed spectrums to be used.

In exemplary embodiments of the present invention, the provided method and source and power node may implement dynamic spectrum allocation without using a central authority and avoid the conflict occurred when several devices request a same licensed spectrum.

BRIEF DESCRIPTION OF THE DRAWINGS

The invention itself, the preferable mode of use and further objectives are best understood by reference to the following detailed description of the embodiments when read in conjunction with the accompanying drawings, in which.

DETAILED DESCRIPTION OF THE INVENTION

The embodiments of the present invention are described in detail with reference to the accompanying drawings. Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The present invention proposes the following aspects are considered:

In this invention, our design is different from prior art in some aspects such as:

We design a distributed selection strategy by algorithm to dynamically select a few power nodes from the network. Like a democratic system, power nodes are dynamically replaceable, if they become less active or demonstrate unacceptable behavior. Then, power nodes will play a crucial role in a distributed dynamic spectrum allocation solution, which may be also called as a distributed dynamic spectrum allocation protocol, for finding idle licensed channels. In prior art, a central authority is employed to manage dynamic spectrum allocation.

If routing is necessary in the network, only the source device is asked to find an idle licensed channel. The routers can continue using the idle licensed channel until the destination device receives data packets. In prior art, each device must find idle licensed channels.

Figure 1:
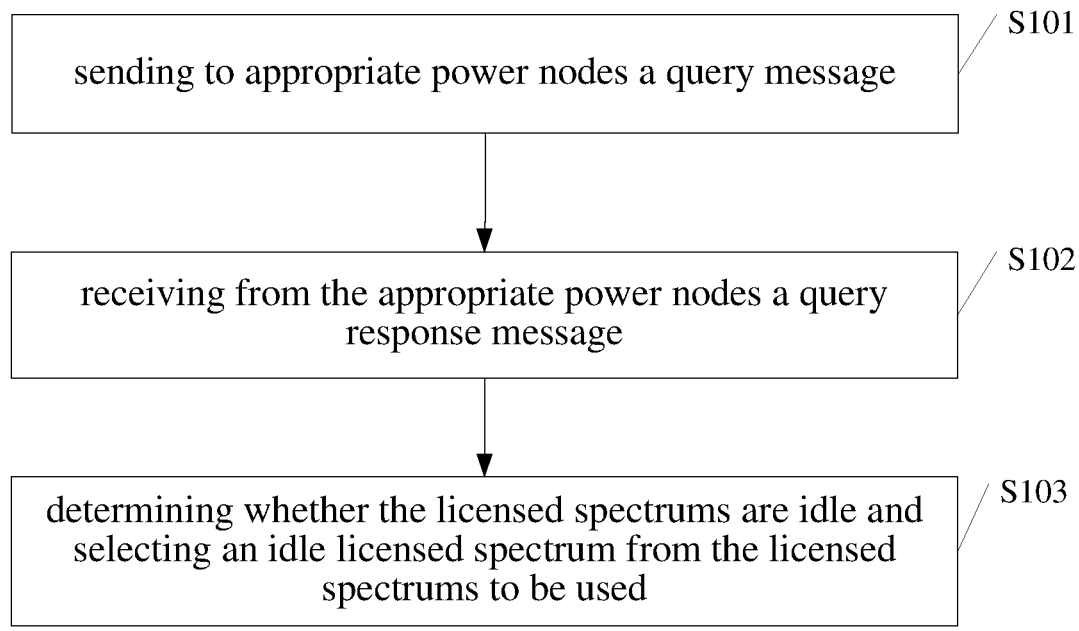
FIG. 1 is a flowchart illustrating a method for distributed dynamic spectrum allocation performed by a source device in accordance with one embodiment of the present invention.

Based on the above design, the present invention provides a method for distributed dynamic spectrum allocation performed by a source device, as shown in FIG. 1, the method may comprise:

at step S101, sending to appropriate power nodes a query message indicating that the source device requests to find an idle licensed spectrum;

at step S102, receiving from the appropriate power nodes a query response message indicating licensed spectrums; and at step S103, determining whether the licensed spectrums are idle and selecting an idle licensed spectrum from the licensed spectrums to be used. Wherein the source device may be the device which wants to send data packets to the destination device in the network, the source device and the destination device may be interchanged according to actual needs.

Then the provided method may implement dynamic spectrum allocation without using a central authority and avoid the conflict occurred when several devices request a same licensed spectrum.

In an exemplary embodiment, the method may further comprise: before the step of sending to appropriate power nodes a query message, selecting appropriate power nodes which further comprising:

selecting randomly a plurality of devices as initial power nodes;

eliminating power nodes which responding with wrong information or no information to the source device from the initial power nodes. Then the remaining nodes may be the appropriate power nodes.

In an exemplary embodiment, the step of selecting appropriate power nodes may further comprise: supplementing new power nodes in the same number of the eliminated power nodes. The new power nodes may be selected randomly from the network to supplement the group of the power nodes.

In an exemplary embodiment, the method may further comprise: sending data packets to routers and reporting the selected idle licensed spectrum so as to make it to be used by routers.

In an exemplary embodiment, step s103 is performed in case of more than half of query response messages received contains a same spectrum.

In an exemplary embodiment, the method may further comprise: reporting the selected idle spectrum to the appropriate power nodes which then marks the selected idle spectrum as in use.

In an exemplary embodiment, wherein the query message comprises the ID of source device, the request for an idle licensed spectrum, and the sending timestamp of the query message; the query response message comprises the ID of the power node, the ID of the licensed spectrums, and the sending timestamp of the query response message.

In an exemplary embodiment, the query response message may further comprise the information on spectrums in-use by primary users.

In an exemplary embodiment, the method may further comprise: receiving a new query response message from the appropriate power nodes and selecting a new idle spectrum from the licensed spectrums in case of the primary user (PU) who holds the selected idle spectrum coming back. The PU may have higher priority to use its licensed spectrum than the general users including the source device and the destination device.

The method according to the present invention may be used in a distributed communication network where spectrum resources are scarce and implemented in a distributed manner, and it may be performed with the help of power nodes which may be selected, such as, by the proposed "power nodes selection" algorithm detailed described in the following example.

A procedure for distributed dynamic spectrum allocation performed by a source device may be given as example as follows:

In this example, the method for managing distributed dynamic spectrum allocation with the sensing channel and reporting channel for distributed wireless communication networks may include two parts: "power nodes selection" and "distributed dynamic spectrum allocation protocol".

1. Power Nodes Selection

In this invention, power nodes can be selected dynamically, based on three steps: initialization, elimination and replacement.

Initialization: In a new network, all devices have nothing on trust value. n devices may be selected randomly to become power nodes at first. Several power nodes are necessary for a network since there might be some malicious power devices reports or some wrong information for idle channels.

Elimination: All power nodes must respond to Query messages from source devices who request CSS action with a query response message, which may be called a message such as a QueryHit message. However, there are two unhoped cases which should be taken in consideration: 1) compared with a majority of power nodes, a few power nodes may respond with inconsistent information on licensed channels accidentally or intentionally, 2) a few power nodes may reject to respond to the Query messages. For instance, if a power device (such as $N_h$ has reported wrong information, source devices can send their feedback including the QueryHit message of $N_h$ to all power nodes who will check whether the information on licensed channels held in their channel database is consistent with the feedback from source devices. Meanwhile, they update behavior value ($f_h$, $q_h$) of $N_h$, as follows $$\text{behavior value} \xrightarrow{update} \begin{cases} f_h = f_h + 1, \text{ two unhoped cases occured in } N_h \\ q_h = q_h + 1, \text{ when receiving a Query message} \end{cases} \quad (1)$$

Then, the power value of $N_h$ at each power nodes can be calculated as $$W_h = \frac{q_h - f_h}{q_h + 1} \quad (2)$$

If $W_h < \varepsilon$, $N_h$ will be kicked out of the group of power nodes, wherein $\varepsilon$ is the threshold of power value, which may be predetermined, for example, $W_h$ may be between 0~1, and $\varepsilon$ may be set to be 0.5. To avoid $q_h=0$ in the initialization step of network devices, the denominator of equation (1) is set to be $q_h+1$.

Replacement: in order to avoid increasing the load of power nodes, we cannot argue that n-1 power nodes select the most trustworthy device as soon as one power is kicked out. We can wait until that m power nodes are kicked out. Then optionally, the other n-m (m<<n) power nodes can select new m devices randomly from the network to supplement their group, wherein n and m are natural numbers.

Figure 2:
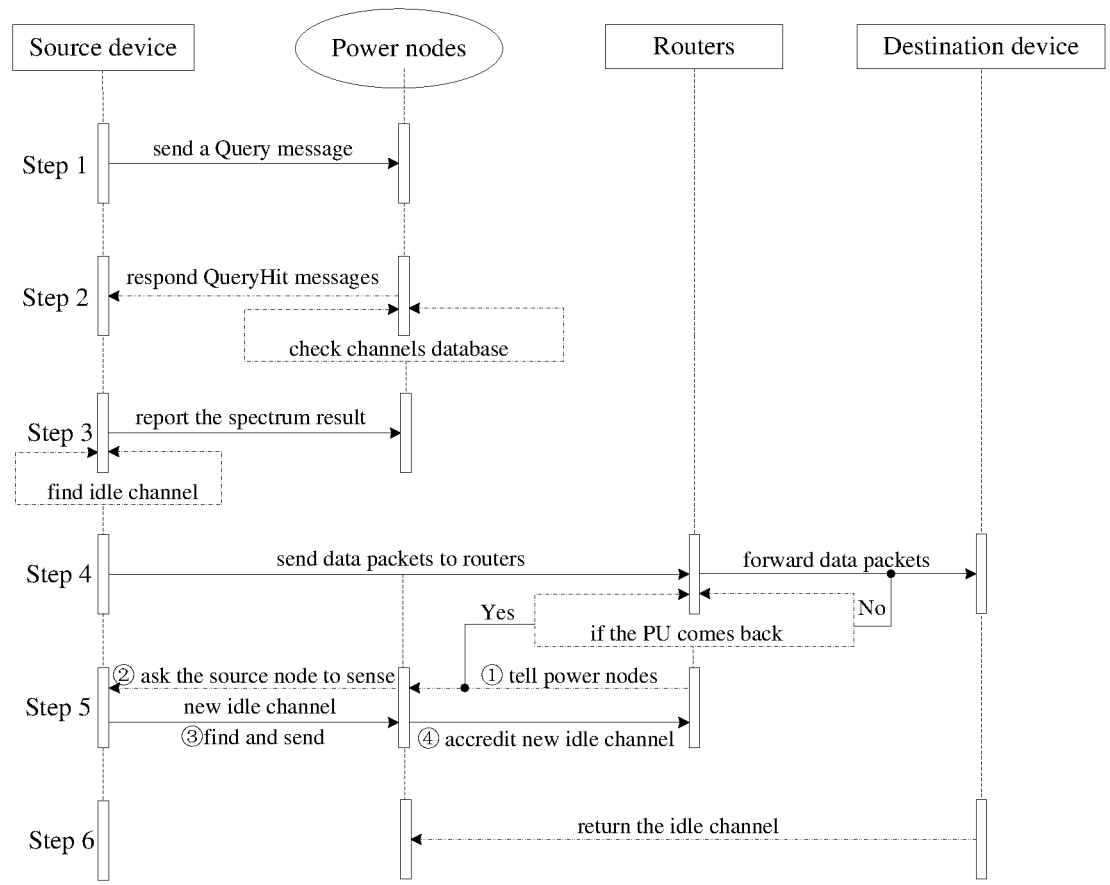
FIG. 2 shows an example of the message flow for the distributed dynamic spectrum allocation (DDSA) protocol in accordance with one embodiment of the present invention.

The above process for Distributed selection strategy for power nodes may be implemented by the following algorithm as an example:

---
Algorithm Distributed selection strategy for power nodes
---
Input: all mobile devices in the network
Output: n devices as power nodes
  1: n devices are selected randomly as power nodes
  2: each W* is generated for power nodes
  3: initialize unhoped=0
  4: for one W*<ε do
  5:   if unhoped==m do
  6:     n-m power nodes broadcast all W * values among themselves to select
           m new power nodes
  7:     m devices are selected randomly as new power nodes
  8:     unhoped=0
  9:   else
 10:     unhoped++
 11:   end if
 12: else for 2. Distributed Dynamic Spectrum Allocation Protocol As shown in FIG. 2, the process for the distributed dynamic spectrum allocation (DDSA) protocol may comprise the follows steps:

Step 1. A source device (such as $N_i$) sends a Query message $Q[i](N_i, FIS_i, ST_i)$, $FIS_i$ indicates that $N_i$ wants to find an idle licensed spectrum for transferring data packets and requests whether there are licensed spectrums which can be detected as a free channel. $ST_i$ is the sending timestamp of Q[i].

Step 2. All power nodes must maintain a channel database which contains the ID of licensed spectrums and the information of in-use PU spectrums. Upon receiving Q[i], each power device checks its channel database and responds with a QueryHit message $QH[ki]=(N_k, L_t, ST^k_{it}, R_{it})$. $N_k$ is the ID of the k-th power nodes. $L_t$ is the ID of the t-th licensed spectrum. $ST^k_{it}$ is the timestamp for the responding QH[i] of $N_k$. $R_{it}=h(N_i*L_t)$, which means power nodes give the spectrum right for $L_j$ to $N_i$. There are two advantages with this equation in $R_{it}$: 1) all power nodes respond with the same value in $R_{it}$, so $N_i$ can check whether QH[ki] is from power nodes, 2) h(•) is the irreversible hash function which can only be held by power nodes, so malicious devices cannot falsify $R_{it}$ even though they know the IDs ($N_i$ and $L_t$). Specially, to avoid the conflict of the same idle licensed channel, all source devices and power nodes must follow three constrained rules in this protocol as follows: 1) all source devices cannot find an idle licensed spectrum until each of them receive QueryHit messages (QH[ki]s), 2) power nodes will respond with QH[ki]s in the order of the sending timestamp, 3) the ID of licensed spectrums should be added to QH[ki]s in advance when power nodes get the feedback of their idle channels from the destination devices who have received data packets.

Step 3. If more than half of QH[ki]s contain $L_t$, $N_i$ will check whether the $L_t$ spectrum is idle. If there are not more than half of QH[ki]s containing a same licensed spectrum, the process will go back to step 1 and wait for new QH[ki]s. Then, if $L_t$ is idle, $N_i$ reports its sensing result containing the idle licensed spectrum to power nodes and go to Step 4. If not, $N_i$ also reports the sensing result to power nodes and go back to Step 1. At the moment of obtaining the result, power nodes mark $L_t$ spectrum as in-use in their channel database. To save cost, the marked $L_t$ spectrum can also be used by the routers who are responsible for forwarding the data packets of $N_i$ until the PU who holds $L_t$ comes back to use $L_t$ or the destination device receives the data packets.

Step 4. $N_i$ sends his data packets and sense result to the routing path containing routers. If DDSA is performed in cognitive radio networks and the PU who holds $L_t$ comes back, the routers in the routing path should withdraw from the $L_t$ spectrum and go to Step 5. If not, go to step 6 directly.

Step 5. Four sub-steps will be performed: ① The routers tell power nodes that $L_t$ spectrum is withdrawn. ② Power nodes send new QH[ki]s to $N_i$ and ask $N_i$ to sense new idle channel. ③ $N_i$ finds another idle spectrum again, and then sends the sense result of new idle channel to power nodes. ④ Power nodes accredit the new idle channel to the routers to keep up forwarding the data packets of $N_i$.

Step 6. Upon receiving $N_i$'s data packets, the destination device must return the idle channel to power nodes as soon as possible.

Figure 3:
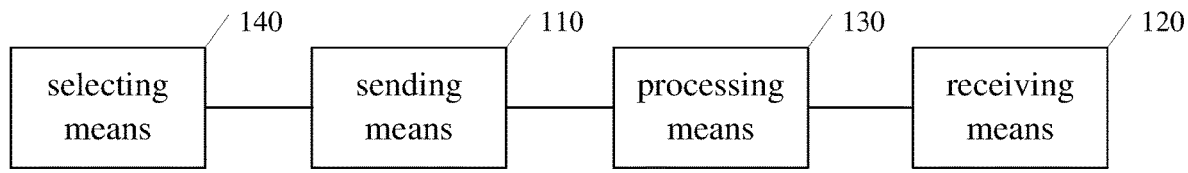
FIG. 3 illustrates a block diagram for a source node for distributed dynamic spectrum allocation in accordance with one embodiment of the present invention.

The present invention further provides a source device for distributed dynamic spectrum allocation, as shown in FIG. 3, the source device may comprise:

sending means 110, configured to send to appropriate power nodes a query message indicating that the source device requests to find an idle licensed spectrum;

receiving means 120, configured to receive from the appropriate power nodes a query response message indicating licensed spectrums; and processing means 130, configured to determine whether the licensed spectrums are idle and selecting an idle licensed spectrum from the licensed spectrums to be used.

In an exemplary embodiment, the source device may further comprise:

selecting means 140, configured to select appropriate power nodes, wherein the selecting means 140 is further configured to:

select randomly a plurality of devices as initial power nodes;

eliminate power nodes which responding with wrong information or no information to the source device from the initial power nodes.

In an exemplary embodiment, the selecting means 140 is further configured to: supplement new power nodes in the same number of the eliminated power nodes.

In an exemplary embodiment, the sending means 110 is further configured to send data packets to routers and report the selected idle licensed spectrum to be used by routers.

In an exemplary embodiment, the processing means 130 is configured to determine whether the licensed spectrums are idle in case of more than half of query response messages received contains a same spectrum.

In an exemplary embodiment, wherein the sending means 110 is further configured to report the selected idle spectrum to the appropriate power nodes which then marks the selected idle spectrum as in use.

In an exemplary embodiment, wherein the query message comprises the ID of source device, the request for an idle licensed spectrum, and the sending timestamp of the query message; the query response message comprises the ID of the power node, the ID of the licensed spectrums, and the sending timestamp of the query response message.

In an exemplary embodiment, the query response message may further comprise the information on spectrums in-use by primary users.

In an exemplary embodiment, the receiving means 120 is further configured to receiving a new query response message from the appropriate power nodes, and wherein the selecting means 140 is further configured to selecting a new idle spectrum from the licensed spectrums in case of the primary user who holds the selected idle spectrum coming back.

Figure 4:
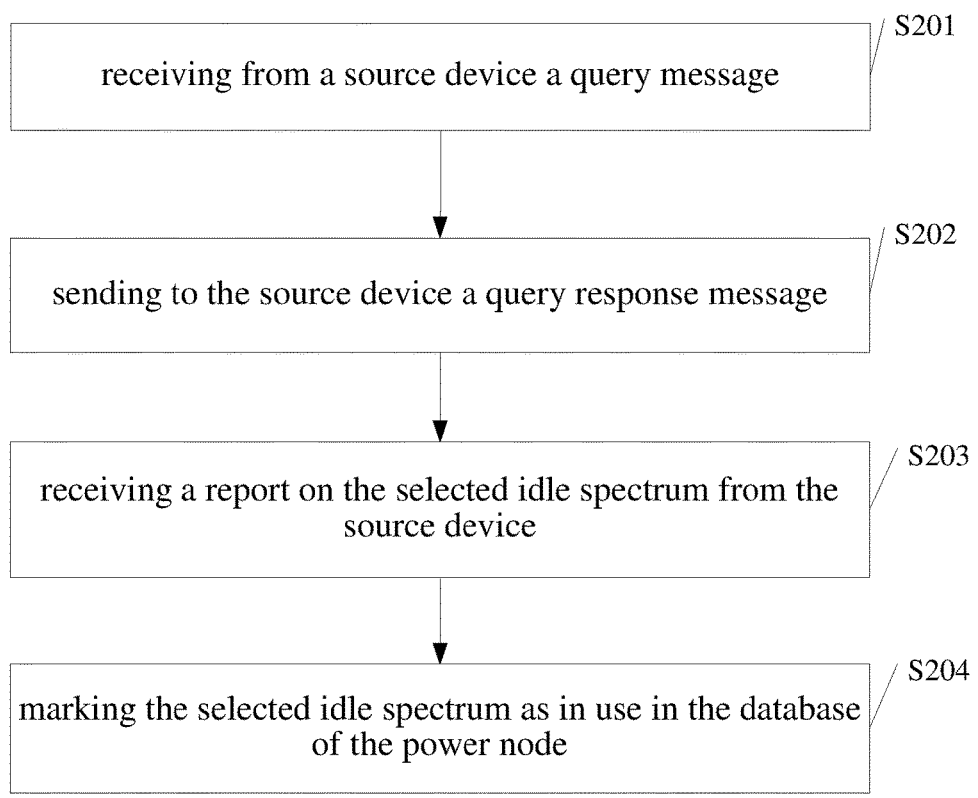
FIG. 4 is a flowchart illustrating a method for distributed dynamic spectrum allocation performed by a power node in accordance with one embodiment of the present invention.
Figure 5:
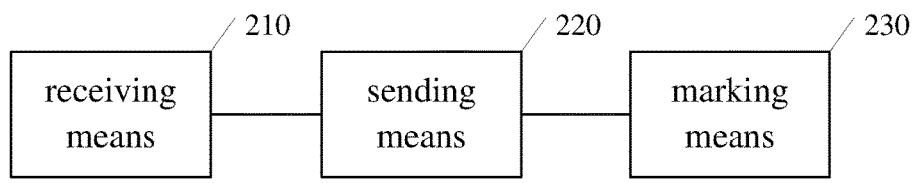
FIG. 5 illustrates a block diagram for a power node for distributed dynamic spectrum allocation in accordance with one embodiment of the present invention.

The present invention further provides a method for distributed dynamic spectrum allocation performed by power node, as shown in FIG. 4, the method may comprise:

at step S201, receiving from a source device a query message indicating that a source device requests to find an idle licensed spectrum;

at step S202, sending to the source device a query response message indicating licensed spectrums so as to make the source device select an idle licensed spectrum from the licensed spectrums to be used.

A plurality of power nodes may be employed together to implement the above distributed dynamic spectrum allocation method.

In an exemplary embodiment, the method may further comprise:

at step S203, receiving a report on the selected idle spectrum from the source device; and at step S204, marking the selected idle spectrum as in use in the database of the power node.

In an exemplary embodiment, the query message may comprise the ID of source device, the request for an idle licensed spectrum, and the sending timestamp of the query message; the query response message comprises the ID of the power node, the ID of the licensed spectrums, and the sending timestamp of the query response message.

In an exemplary embodiment, the query response message may further comprise the information on spectrums in-use by primary users.

In an exemplary embodiment, the method may further comprise:

receiving from a router a report indicating the primary user who holds the selected idle spectrum coming back;

sending a new query response message to the source device; and receiving a new idle licensed spectrum selected by the source device, and accrediting the router to use the new idle licensed spectrum.

In an exemplary embodiment, the method may further comprise: receiving the idle licensed spectrum returned by a destination device after the destination device receiving the data packets from the source device.

The present invention further provides power node for distributed dynamic spectrum allocation, comprising:

receiving means 210, configured to receive from a source device a query message indicating that a source device requests to find an idle licensed spectrum;

sending means 220, configured to send to the source device a query response message indicating licensed spectrums so as to make the source device select an idle licensed spectrum from the licensed spectrums to be used.

In an exemplary embodiment, the receiving means 210 is further configured to receive a report on the selected idle spectrum from the source device; and the power node may further comprise marking means 230, the marking means 230 is configured to mark the selected idle spectrum as in use in the database of the power node.

In an exemplary embodiment, the query message may comprise the ID of source device, the request for an idle licensed spectrum, and the sending timestamp of the query message; the query response message may comprise the ID of the power node, the ID of the licensed spectrums, and the sending timestamp of the query response message.

In an exemplary embodiment, the query response message may further comprise the information on spectrums in-use by primary users.

In an exemplary embodiment, the receiving means 210 is further configured to receive from a router a report indicating the primary user who holds the selected idle spectrum coming back;

the sending means 220 is further configured to send a new query response message to the source device; and the receiving means 210 is further configured to receive a new idle licensed spectrum selected by the source device, and accrediting the router to use the new idle licensed spectrum.

In an exemplary embodiment, the receiving means 210 is further configured to receive the idle licensed spectrum returned by a destination device after the destination device receiving the data packets from the source device.

The method, source device and power nodes according to the present invention bring advantages as follows:
- it can manage a dynamic spectrum allocation in distributed manner for the wireless communication networks in which the licensed spectrums are scarce;
- if there is no central authority, power nodes can be selected by a distributed selection strategy;
- in the DDSA protocol, all source devices cannot find an idle licensed spectrum until they receive query response messages from power nodes, and thus the conflict occurred when several devices request a same licensed spectrum may be avoided;
- in the DDSA protocol, the idle licensed spectrum found by source device can also be used by the routers who are responsible for forwarding data packets, and thus network load is reduced as compared with that in prior art.

At least one of the above means is assumed to comprise program instructions that, when executed, enable the apparatus to operate in accordance with the exemplary embodiments, as discussed above. Any of the above means as discussed above may be integrated together or implemented by separated components, and may be of any type suitable to the local technical environment, and may comprise one or more of general purpose computers, special purpose computers, microprocessors, digital signal processors (DSP) and processors based on multi-core processor architectures, as non-limiting examples. The ROM mentioned above may be of any type suitable to the local technical environment and may be implemented using any suitable data storage technology, such as semiconductor based memory devices, flash memory, magnetic memory devices and systems, optical memory devices and systems, fixed memory and removable memory.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flowcharts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It will be appreciated that at least some aspects of the exemplary embodiments of the inventions may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), and etc. As will be realized by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

Although specific embodiments of the invention have been disclosed, those having ordinary skill in the art will understand that changes can be made to the specific embodiments without departing from the spirit and scope of the invention. The scope of the invention is not to be restricted therefore to the specific embodiments, and it is intended that the appended claims cover any and all such applications, modifications, and embodiments within the scope of the present invention.

What is claimed is:

1. A method for distributed dynamic spectrum allocation performed by a source device, comprising:
   selecting appropriate power nodes comprising:
      selecting randomly a plurality of devices as initial power nodes;
      sending to the initial power nodes a query message indicating that the source device requests to find an idle licensed spectrum;
      eliminating power nodes which respond with wrong information or no information to the source device from the initial power nodes to select the appropriate power nodes;
   receiving from the appropriate power nodes a query response message indicating licensed spectrums; and
   determining whether the licensed spectrums are idle and selecting an idle licensed spectrum from the licensed spectrums to be used.

2. The method according to claim 1, the step of selecting appropriate power nodes further comprising:
   supplementing new power nodes in the same number of the eliminated power nodes.

3. The method according to claim 1, further comprising:
sending data packets to routers and reporting the selected idle licensed spectrum so as to make it to be used by routers.

4. The method according to claim 1, the step of determining whether the licensed spectrums are idle is performed in case of more than half of query response messages received contains a same spectrum.

5. The method according to claim 1, further comprising: reporting the selected idle spectrum to the appropriate power nodes which then marks the selected idle spectrum as in use.

6. The method according to claim 1, wherein the query message comprises an ID of the source device, the request for the idle licensed spectrum, and a sending timestamp of the query message; the query response message comprises an ID of the power node, an ID of the licensed spectrums, and a sending timestamp of the query response message.

7. The method according to claim 6, wherein the query response message further comprises information on spectrums in-use by primary users.

8. The method according to claim 7, further comprising:
receiving a new query response message from the appropriate power nodes and selecting a new idle spectrum from the licensed spectrums in case of the primary user who holds the selected idle spectrum coming back.

9. A source device for distributed dynamic spectrum allocation, comprising:
circuitry configured to select appropriate power nodes, wherein the circuitry configured to select is further configured to:
select randomly a plurality of devices as initial power nodes;
send to the initial power nodes a query message indicating that the source device requests to find an idle licensed spectrum
eliminate power nodes which respond with wrong information or no information to the source device from the initial power nodes to select the appropriate power nodes;
circuitry configured to receive from the appropriate power nodes a query response message indicating licensed spectrums; and
circuitry configured to determine whether the licensed spectrums are idle and selecting an idle licensed spectrum from the licensed spectrums to be used.

10. The source device according to claim 9, wherein the circuitry configured to send is further configured to send data packets to routers and report the selected idle licensed spectrum to be used by routers.

11. The source device according to claim 9, wherein the circuitry configured to determine is configured to determine whether the licensed spectrums are idle in case of more than half of query response messages received contains a same spectrum.

12. The source device according to claim 9, wherein the circuitry configured to send is further configured to report the selected idle spectrum to the appropriate power nodes which then marks the selected idle spectrum as in use.

13. The source device according to claim 9, wherein the query message comprises an ID of the source device, the request for the idle licensed spectrum, and a sending timestamp of the query message; the query response message comprises an ID of the power node, an ID of the licensed spectrums, and a sending timestamp of the query response message.

14. The source device according to claim 13, wherein the query response message further comprises information on spectrums in-use by primary users.

15. The source device according to claim 13, wherein
the circuitry configured to receive is further configured to receive a new query response message from the appropriate power nodes, and wherein the circuitry configured to select is further configured to select a new idle spectrum from the licensed spectrums in case of the primary user who holds the selected idle spectrum coming back.

16. A method for distributed dynamic spectrum allocation performed by a power node, comprising:
receiving from a source device a query message indicating that a source device requests to find an idle licensed spectrum;
sending to the source device a query response message indicating licensed spectrums so as to make the source device select an idle licensed spectrum from the licensed spectrums to be used;
wherein the query message comprises an ID of the source device, the request for the idle licensed spectrum, and a sending timestamp of the query message; the query response message comprises an ID of the power node, an ID of the licensed spectrums, and a sending timestamp of the query response message;
wherein the query response message further comprises information on spectrums in-use by primary users;
receiving from a router a report indicating the primary user who holds the selected idle spectrum coming back;
sending a new query response message to the source device; and
receiving a new idle licensed spectrum selected by the source device, and accrediting the router to use the new idle licensed spectrum.

17. The method according to claim 16, further comprising:
receiving a report on the selected idle spectrum from the source device; and
marking the selected idle spectrum as in use in a database of the power node.

18. The method according to claim 16, further comprising:
receiving the idle licensed spectrum returned by a destination device after the destination device receives data packets from the source device.

19. A power node for distributed dynamic spectrum allocation, comprising:
circuitry configured to receive from a source device a query message indicating that a source device requests to find an idle licensed spectrum; and
circuitry configured to send to the source device a query response message indicating licensed spectrums so as to make the source device select an idle licensed spectrum from the licensed spectrums to be used;
wherein the query message comprises an ID of the source device, the request for the idle licensed spectrum, and a sending timestamp of the query message; the query response message comprises an ID of the power node, an ID of the licensed spectrums, and a sending timestamp of the query response message;
wherein the query response message further comprises information on spectrums in-use by primary users;
wherein the circuitry configured to receive is further configured to receive from a router a report indicating the primary user who holds the selected idle spectrum coming back;

wherein the circuitry configured to send is further configured to send a new query response message to the source device;

wherein the circuitry configured to receive is further configured to receive a new idle licensed spectrum selected by the source device, and accredit the router to use the new idle licensed spectrum.

20. The power node according to claim 19, wherein
the circuitry configured to receive is further configured to receive a report on the selected idle spectrum from the source device; and the power node further comprising:
circuitry configured to mark the selected idle spectrum as in use in a database of the power node.

21. The power node according to claim 19, wherein the circuitry configured to receive is further configured to receive the idle licensed spectrum returned by a destination device after the destination device receives data packets from the source device.

22. A computer program product embodied on a non-transitory computer-readable medium in which a computer program is stored that, when being executed by a computer, is configured to provide instructions to carry out the method of claim 1.

23. A computer program product embodied on a non-transitory computer-readable medium in which a computer program is stored that, when being executed by a computer, is configured to provide instructions to carry out the method of claim 16.

* * * * *